US006804749B2

(12) United States Patent
Chien et al.

(10) Patent No.: US 6,804,749 B2
(45) Date of Patent: Oct. 12, 2004

(54) WIRELESS PORTABLE ADAPTIVE ELECTRONIC DEVICE CAPABLE OF RECEIVING SIGNALS

(75) Inventors: Chao-Wu Chien, Chung Ho (TW); Venson Liao, Chung Ho (TW); Kun Chan Wu, Chung Ho (TW)

(73) Assignee: Topseed Technology Corp., Taipei Hsien (TW)

( * ) Notice: Subject to any disclaimer, the term of this patent is extended or adjusted under 35 U.S.C. 154(b) by 178 days.

(21) Appl. No.: 10/173,391

(22) Filed: Jun. 18, 2002

(65) Prior Publication Data

US 2003/0233519 A1 Dec. 18, 2003

(51) Int. Cl.[7] .................................... G06F 12/00

(52) U.S. Cl. ......................... 711/115; 463/39; 361/752; 710/301

(58) Field of Search ........................... 463/39; 361/752; 710/301; 711/115

(56) References Cited

U.S. PATENT DOCUMENTS

| | | | | | |
|---|---|---|---|---|---|
| 6,522,552 | B1 | * | 2/2003 | Lee | 361/752 |
| 6,565,441 | B1 | * | 5/2003 | Hames et al. | 463/39 |
| 6,585,596 | B1 | * | 7/2003 | Leifer et al. | 463/39 |
| 6,654,841 | B2 | * | 11/2003 | Lin | 710/301 |

* cited by examiner

*Primary Examiner*—Mano Padmanabhan
*Assistant Examiner*—Thang Ho
(74) *Attorney, Agent, or Firm*—Rosenberg, Klein & Lee

(57) ABSTRACT

A wireless portable adaptive electronic device capable of receiving signals includes a portable casing having a USB connector and a USB based connecting port thereon. The USB based connecting port is used for connecting a storage medium and a control circuit with radio signal receiving function and adapting function installed in the portable casing. The control circuit is electrically connected with the USB connector and the USB based connecting port, thereby controlling data read or data write of the storage medium and transferring data through the wireless portable adaptive electronic device.

6 Claims, 4 Drawing Sheets

WIRELESS PORTABLE ADAPTIVE ELECTRONIC DEVICE CAPABLE OF RECEIVING SIGNALS

BACKGROUND OF THE INVENTION

1. Field of the Invention

The present invention relates to a wireless portable adaptive electronic device capable of receiving signals. More particularly, the present invention relates to a portable device incorporating wireless signal receiving and adapting function.

2. Description of the Prior Art

FIG. 1 is a typical view of a prior art wireless portable electronic device capable of storing data. The prior art wireless portable electronic device as illustrated in FIG. 1 is typically utilized during a presentation. As shown in FIG. 1, the prior art wireless portable electronic device comprises a casing 1*a* with data storage and signal receiving circuits built therein. In the front end of the portable casing 1*a*, there is provided a connecting interface 11*a* for connecting a computer.

The above-mentioned prior art portable wireless device has a dual-function of receiving signals and storing data. During a conference or presentation, a speaker can control paging or line switching by using a remote controller that transmits a radio signal to the portable wireless device. Generally, the portable wireless device includes a connecting interface, an access circuit for implementing read or write commands, a memory device electrically connected to the access circuit for storing data, wherein the memory device receives the read or write commands from the access circuit, a receiving circuit for receiving a radio signal, and a control circuit electrically connected to the connecting interface. The control circuit controls the read or write commands and receives the radio signal transferred from the receiving circuit. The control circuit transfers data through the connecting interface.

However, the prior art portable wireless device has a shortcoming that it can only read data stored in the memory device itself. Therefore, the prior art portable wireless device is not suited for reading data stored in other storage media such as game pad and joystick.

SUMMARY OF THE INVENTION

It is a primary object of the present invention to provide a wireless portable adaptive electronic device capable of receiving signals. The wireless portable adaptive electronic device according to the present invention can read data stored in different storage media.

According to the claimed invention, the wireless portable adaptive electronic device includes:

a portable casing having a USB connector and a USB based connecting port thereon, the USB based connecting port being used for connecting a storage medium; and a control circuit with radio signal receiving function and adapting function installed in the portable casing, wherein the control circuit is electrically connected with the USB connector and the USB based connecting port, thereby controlling data read or data write of the storage medium and transferring data through the wireless portable adaptive electronic device.

It is to be understood that both the forgoing general description and the following detailed description are exemplary, and are intended to provide further explanation of the invention as claimed. Other advantages and features of the invention will be apparent from the following description, drawings and claims.

DETAILED DESCRIPTION OF THE PREFERRED EMBODIMENT

Figure 1:
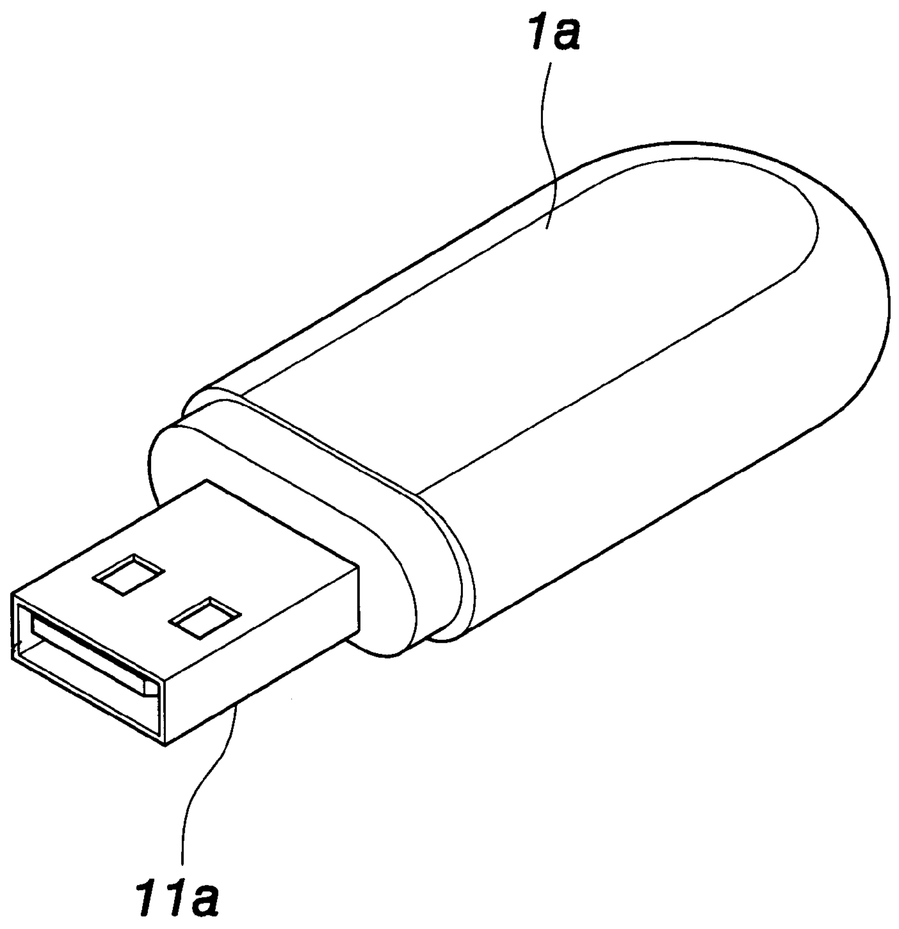
FIG. 1 is a typical view of prior art device.
Figure 2:
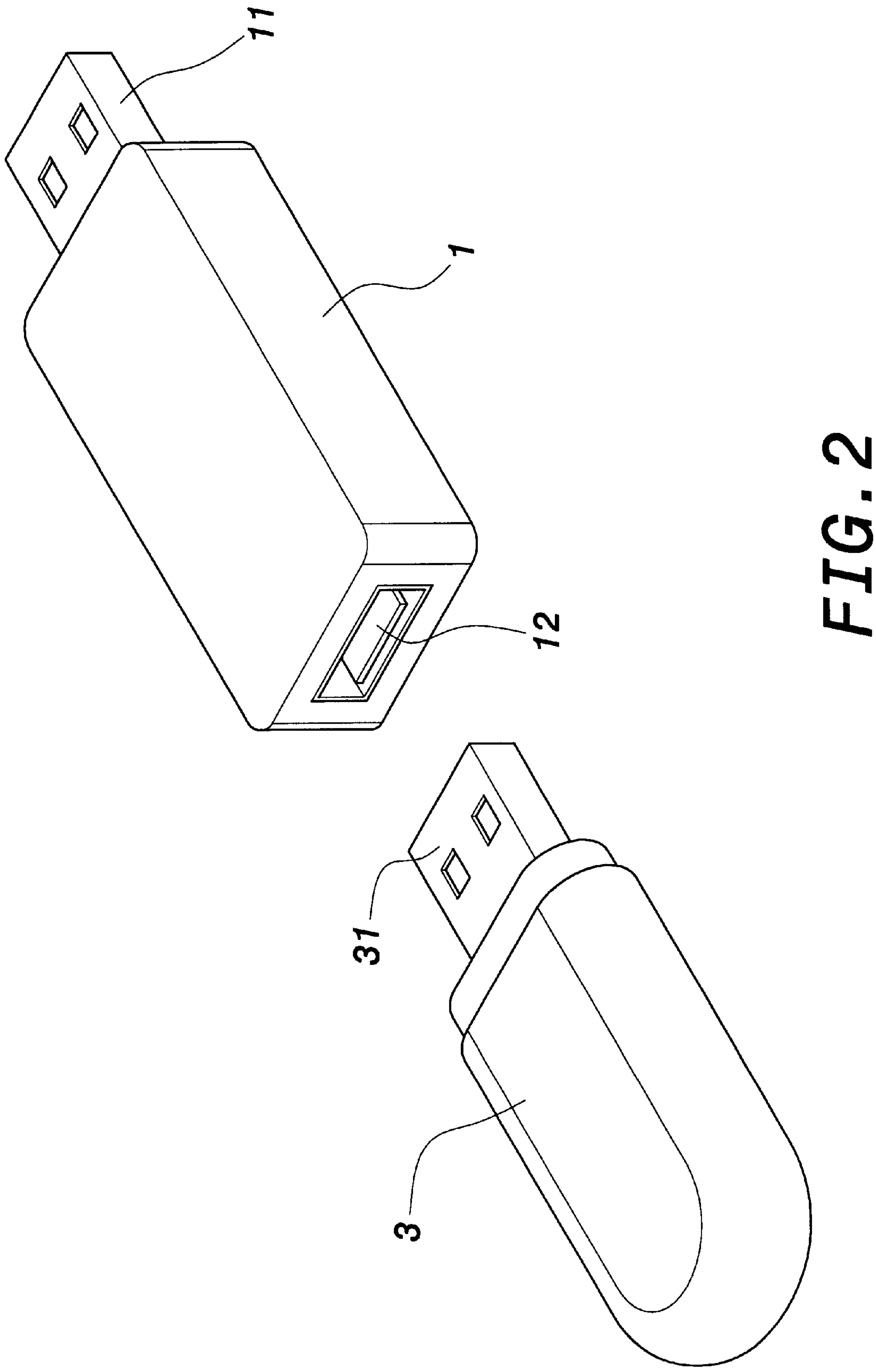
FIG. 2 is a typical view of the present invention.
Figure 3:
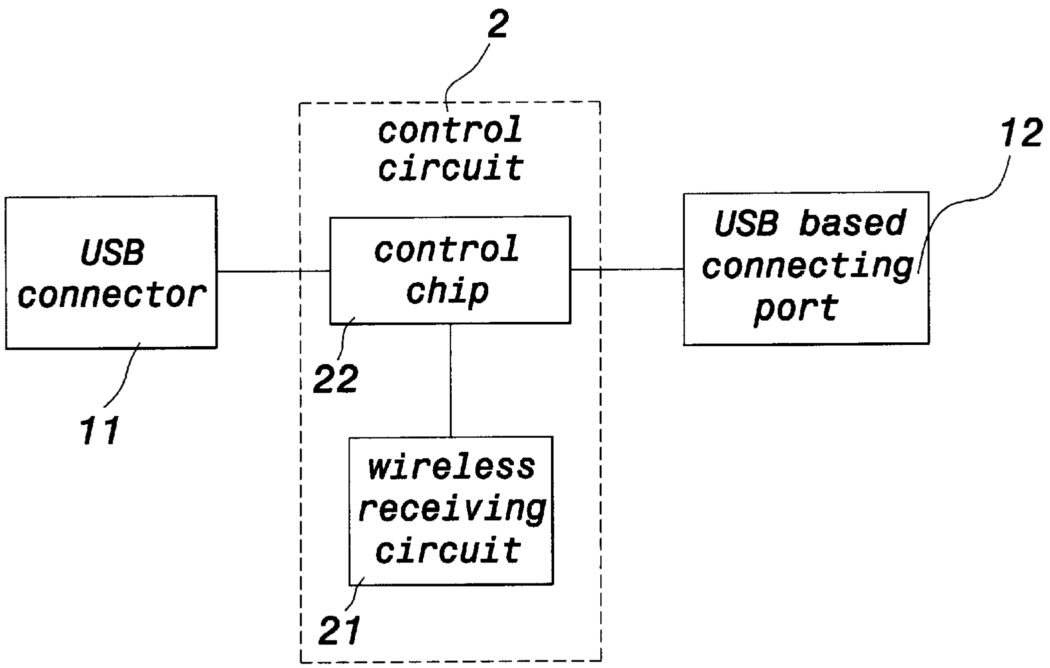
FIG. 3 is a block diagram showing the circuit components of the present invention.
Figure 4:
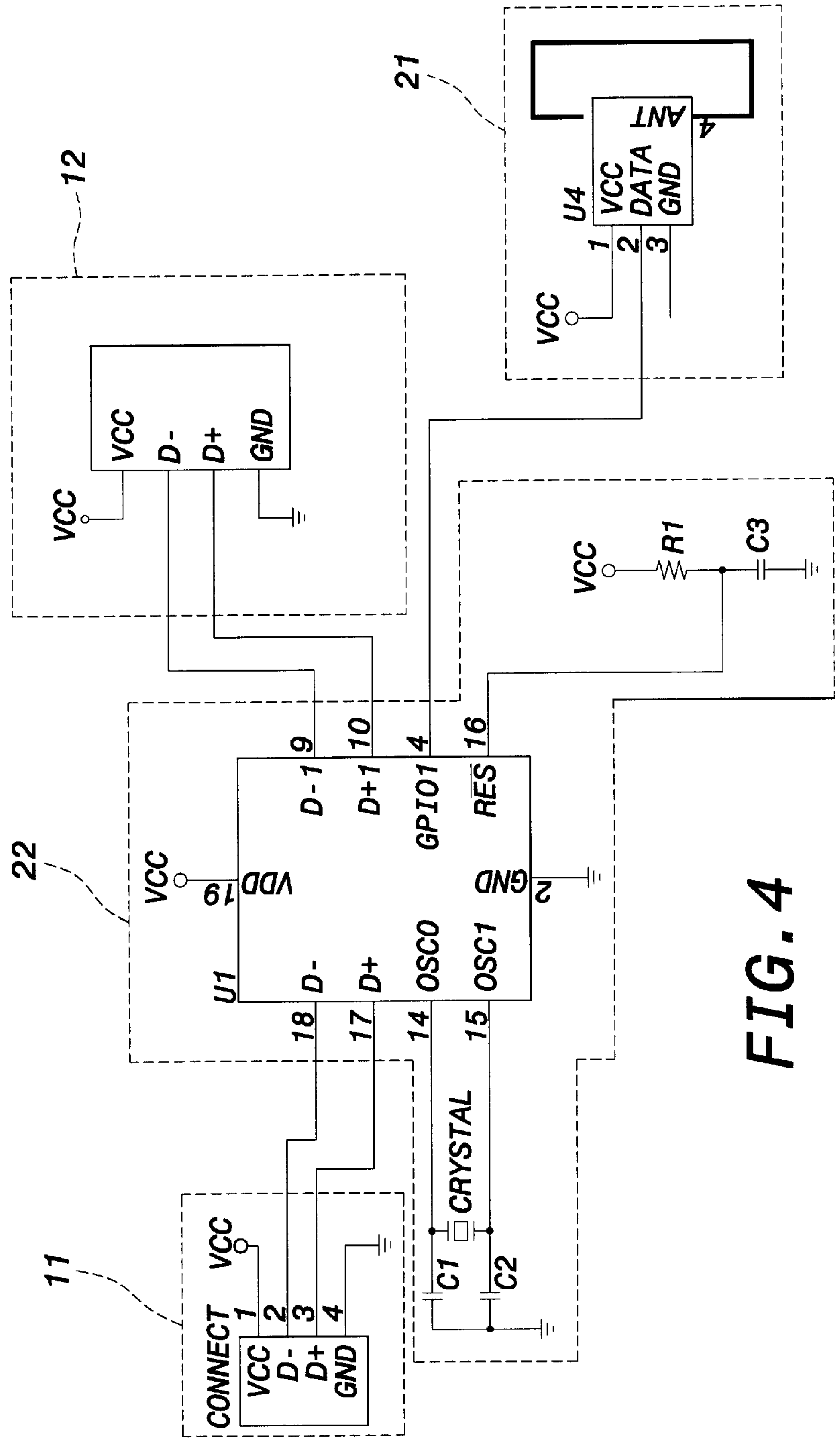
FIG. 4 is a circuit diagram of FIG. 3 according to the present invention.

Please refer to FIG. 2 to FIG. 4. The present invention provides a wireless portable adaptive electronic device capable of receiving signals. The wireless portable adaptive electronic device of the present invention comprises a portable casing 1, a control circuit 2 and a storage medium 3.

As illustrated in FIG. 2, a USB connector 11 is provided at one side of the portable casing 1 for connecting a computer. At the other side of the portable casing 1, a USB based connecting port 12 is provided for connecting the storage medium 3.

As illustrated in FIG. 3, the control circuit 2 is capable of implementing wireless receiving and adapting functions. The control circuit 2 is installed in the portable casing 1 and is electrically connected with the USB connector 11 and the USB based connecting port 12. The control circuit 2 comprises a wireless receiving circuit 21 for receiving signals transmitted from a wireless device such as a wireless mouse, a wireless keyboard, or a remote controller. The control circuit 2 is electrically connected to a control chip 22 that is used to transmit received radio signals through the USB connector 11.

The storage medium 3 comprises a USB based connecting plug 31 for plugging into the USB based connecting port 12 of the portable casing 1. With this configuration, the control circuit 2 is capable of reading data stored in the storage medium 3. On the other hand, data stored in a computer may be transmitted to and written into the storage medium 3 through the wireless portable adaptive electronic device of the present invention.

Figure 5:
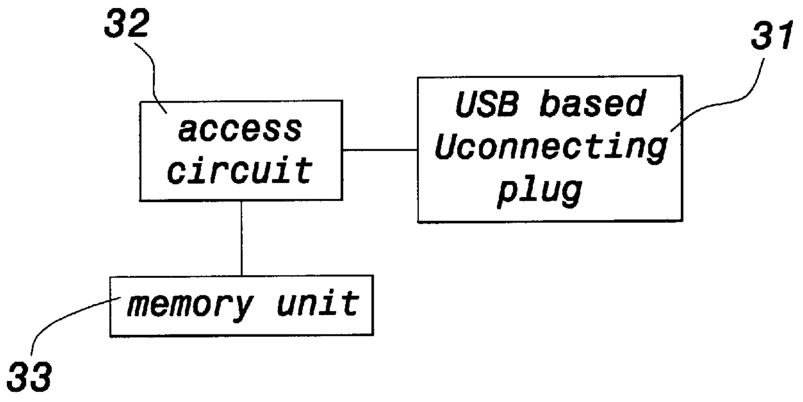
FIG. 5 is a block diagram showing the circuit components of the storage medium according to the present invention.

According to the embodiment of the present invention, the storage medium 3 is a portable removable disk. As shown in FIG. 5, an access circuit 32, which is electrically connected to the USB based connecting plug 31, is installed in the removable disk. The access circuit 32 further connects with a memory unit 33 for reacting to data read or data write actions. These data may be word documents for presentations, excel charts, or the like. Further, the storage medium 3 may be a game pad, joystick, or any other storage medium with a USB interface plug.

From above, a handy wireless portable adaptive electronic device capable of receiving signals can be obtained. The access circuit 2 is in charge of reading or writing data of the storage medium 3. Data stored in a computer may be transmitted to and written into the storage medium 3 through the wireless portable adaptive electronic device.

When one is making a presentation, he or she connects the wireless portable adaptive electronic device with a notebook that is connected to a projector. The frames shown on the monitor of the notebook are projected onto a screen by the projector. The data stored in the portable wireless device may be Excel charts, graphic information, Microsoft word files or the like. The user can control paging or line switching by using a remote controller that generates a radio signal to the wireless portable adaptive electronic device. Storage medium 3 is connected to the USB based connecting port 12.

Briefly, it is advantageous to use the present invention since the present invention includes the following features:

(1) The wireless portable adaptive electronic device have receiving and adapting functions.

(2) The connecting interface is USB connector that is suitable for various USB type storage media.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A wireless portable adaptive electronic device capable of receiving signals comprising:

a portable casing having a USB connector and a USB based connecting port thereon, the USB based connecting port being used for connecting a storage medium; and a control circuit disposed in the portable casing, the control circuit including a control chip and a radio signal receiving circuit coupled thereto, the control chip being coupled to both the USB connector and the USB based connecting port;

wherein the control circuit is operable responsive to a radio signal received by the radio signal receiving circuit for controlling data read or data write access of the storage medium and transfer of data through the wireless portable adaptive electronic device.

2. The portable wireless receiving device of claim 1 wherein the storage medium is a removable disk, a joystick, or a game pad.

3. The portable wireless receiving device of claim 1 wherein the USB connector is a USB based transmission port.

4. A wireless portable adaptive electronic device capable of receiving signals comprising:

a portable casing having a USB connector and a USB based connecting port thereon; and a control circuit disposed in the portable casing, the control circuit including a control chip and a radio signal receiving circuit coupled thereto, the control chip being coupled to both the USB connector and the USB based connecting port;

wherein the control circuit is operable responsive to a radio signal received by the radio signal receiving circuit for controlling data read or data write access of a storage medium detachably coupled to the USB based connecting port;

the storage medium including a USB based connecting plug for plugging into the USB based connecting port.

5. The portable wireless receiving device of claim 4 wherein the storage medium is a removable disk, a joystick, or a game pad.

6. The portable wireless receiving device of claim 4 wherein the USB connector is a USB based transmission port.

* * * * *